United States Patent
Hu et al.

(10) Patent No.: US 10,179,313 B2
(45) Date of Patent: Jan. 15, 2019

(54) SUPER-SURFACE SELECTIVE NANOMEMBRANES PROVIDING SIMULTANEOUS HIGH PERMEATION FLUX AND HIGH SELECTIVITY

(71) Applicant: UT-Battelle, LLC, Oak Ridge, TN (US)

(72) Inventors: Michael Z. Hu, Knoxville, TN (US); John T. Simpson, Clinton, TN (US); Tolga Aytug, Knoxville, TN (US); Mariappan Parans Paranthaman, Knoxville, TN (US); Matthew R. Sturgeon, Arvada, CO (US)

(73) Assignee: UT-BATTELLE, LLC, Oak Ridge, TN (US)

(*) Notice: Subject to any disclaimer, the term of this patent is extended or adjusted under 35 U.S.C. 154(b) by 117 days.

(21) Appl. No.: 15/058,579

(22) Filed: Mar. 2, 2016

(65) Prior Publication Data
US 2016/0250601 A1 Sep. 1, 2016

Related U.S. Application Data

(62) Division of application No. 13/666,217, filed on Nov. 1, 2012, now Pat. No. 9,308,501.

(51) Int. Cl.
*B01D 61/02* (2006.01)
*B01D 61/18* (2006.01)
(Continued)

(52) U.S. Cl.
CPC ....... *B01D 67/0072* (2013.01); *B01D 61/027* (2013.01); *B01D 61/18* (2013.01); *B01D 67/009* (2013.01); *B01D 67/0048* (2013.01); *B01D 67/0069* (2013.01); *B01D 67/0079* (2013.01); *B01D 67/0083* (2013.01); *B01D 67/0093* (2013.01); *B01D 69/02* (2013.01); *B01D 69/125* (2013.01); *B01D 69/142* (2013.01);
(Continued)

(58) Field of Classification Search
None
See application file for complete search history.

(56) References Cited

U.S. PATENT DOCUMENTS

| 5,209,850 A | 5/1993 | Abayasekara et al. |
|---|---|---|
| 7,466,942 B2 | 12/2008 | Zona et al. |

(Continued)

FOREIGN PATENT DOCUMENTS

WO  2010056623 A1  5/2010

OTHER PUBLICATIONS

Aminayi, Payam. Imparting Super Hydro/Oleophobic Properties to Cotton Fabric by Means of Molecular and Nanoparticles Vapor Deposition Methods. Applied Surface Science, Sep. 29, 2013.
(Continued)

*Primary Examiner* — Krishnan S Menon
(74) *Attorney, Agent, or Firm* — Fox Rothschild LLP

(57) ABSTRACT

Superhydrophobic membrane structures having a beneficial combination of throughput and a selectivity. The membrane structure can include a porous support substrate; and a membrane layer adherently disposed on and in contact with the porous support substrate. The membrane layer can include a nanoporous material having a superhydrophobic surface. The superhydrophobic surface can include a textured surface, and a modifying material disposed on the textured surface. Methods of making and using the membrane structures.

6 Claims, 6 Drawing Sheets

(51) Int. Cl.
- *B01D 67/00* (2006.01)
- *B01D 69/02* (2006.01)
- *B01D 69/12* (2006.01)
- *B01D 69/14* (2006.01)
- *B01D 71/02* (2006.01)
- *B01D 71/04* (2006.01)
- *B01D 71/32* (2006.01)

(52) U.S. Cl.
CPC ......... *B01D 69/148* (2013.01); *B01D 71/024* (2013.01); *B01D 71/04* (2013.01); *B01D 71/32* (2013.01); B01D 2323/04 (2013.01); B01D 2325/38 (2013.01)

(56) References Cited

U.S. PATENT DOCUMENTS

| | | |
|---|---|---|
| 7,638,182 B2 | 12/2009 | D'urso et al. |
| 7,799,416 B1 | 9/2010 | Chan et al. |
| 8,017,234 B2 | 9/2011 | Jin et al. |
| 2003/0228969 A1 | 12/2003 | Dong et al. |
| 2006/0024508 A1 | 2/2006 | D'Urso et al. |
| 2007/0184247 A1 | 8/2007 | Simpson et al. |
| 2008/0280699 A1 | 11/2008 | Jarvholm |
| 2009/0142256 A1 | 6/2009 | Wakayama et al. |
| 2009/0196990 A1 | 8/2009 | Simpson et al. |
| 2009/0218275 A1 | 9/2009 | Ramaswamy et al. |
| 2010/0021745 A1 | 1/2010 | Simpson et al. |
| 2010/0086604 A1 | 4/2010 | Stellacci et al. |
| 2011/0052466 A1 | 3/2011 | Liu |
| 2011/0128535 A1 | 6/2011 | Baker et al. |

OTHER PUBLICATIONS

Bang et al., "Block copolymer nanolithography: Translation of molecular level control to nanoscale patterns", Adv. Mater. (2009) 21: 4769-4792.

Matthew R. Sturgeon, Peng Lai, and Michael Z. Hu, "A comparative study of anodized titania nanotube architectures in aqueous and nonaqueous solutions," J. Mater. Res., 26(20), 2612-2623 (2011).

Michael Z. Hu, Peng Lai, M. S. Bhuiyan, Costas Tsouris, Baohua Gu, M.; Parans Paranthaman, Jorge Gabitto and Latoya Harrison, "Synthesis and; Characterization of Anodized Titanium-Oxide Nanotube Arrays", J. Mater.; Sci. 44(11), 2820-2827 (2009).

Michael Z. Hu, Valmor de Almeida, Igor Kosacki, Douglas A Blom, and E.; Andrew Payzant, "Design and Synthesis of Oriented Guest-Host; Nanostructures for Enhanced Membrane Performances," DOE; Information Bridge, web publication; httpliwww.osti.govibridgelpuri.cover.isp?pul=1885953-DgVEUri, Aug. 2006.

H. Rawson, Inorganic Glass Forming Systems, Academic Press, London,; 1967 (Chapter 8); M. B. Volf, Technical Glasses, Pitman, London, 1961 (Chapter 10).

Michael Z. Hu, "Synthesis of Nanostructured Oxide Films via Chemical; Solution Deposition, Molecular Design, and Self-Assembly," Ceramic; Transactions series, vol. 159, 77-91, American Ceramic Society,; Dec. 2004.

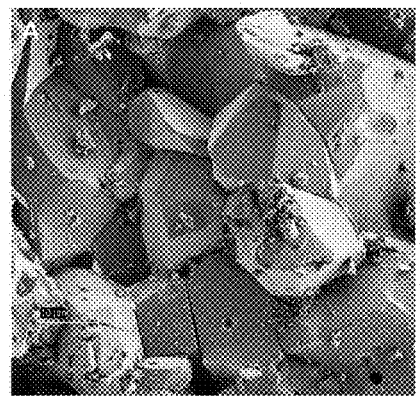 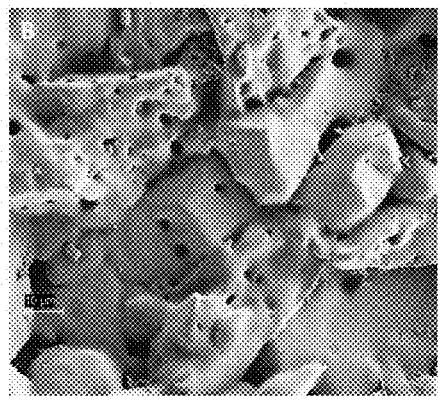
FIGURE 2A  FIGURE 2B
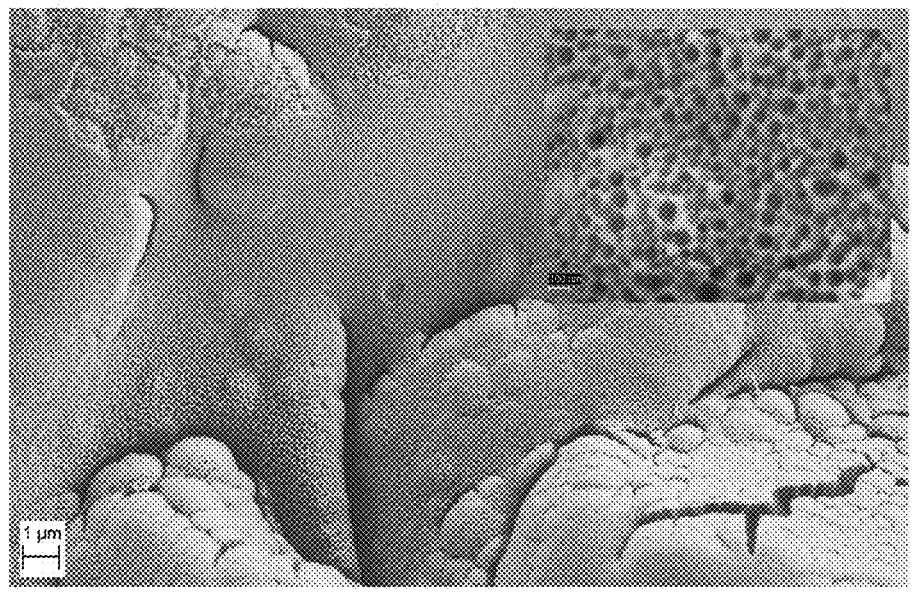
FIGURE 3

SUPER-SURFACE SELECTIVE NANOMEMBRANES PROVIDING SIMULTANEOUS HIGH PERMEATION FLUX AND HIGH SELECTIVITY

CROSS REFERENCE TO RELATED APPLICATIONS

This application is a divisional of application of U.S. Non-provisional application Ser. No. 13/666,217, entitled "SUPER-SURFACE SELECTIVE NANOMEMBRANES PROVIDING SIMULTANEOUS HIGH PERMEATION FLUX AND HIGH SELECTIVITY", filed Nov. 1, 2012, the entirety of which is incorporated herein by reference.

STATEMENT REGARDING FEDERALLY SPONSORED RESEARCH OR DEVELOPMENT

The United States Government has rights in this invention pursuant to contract no. DE-AC05-00OR22725 between the United States Department of Energy and UT-Battelle, LLC.

BACKGROUND OF THE INVENTION

1. Field of the Invention

The invention relates generally to membranes, and more specifically to membranes having beneficial combinations of permeation flux and selectivity.

2. Description of the Related Art

A paradox for prior art membranes is the lack of mechanisms that could enable both high molecular separation selectivity and high permeation flux across the membrane. The state-of-the-art zeolite-based or polymer-zeolite hybrid membranes both require a pore size of less than 0.5 nm to enable high selectivity, but suffer from a loss of permeation flux. There is a need for an alternative membrane design and fabrication methodology that does not rely solely on the pore size.

One class of mesoporous (pore size of about 4 nm) glass membrane or support material is VYCOR®, which is an open-cell, porous glass with an internal surface area of approximately 250 square meters per gram. The glass is typically in the form of tubes, having an internal diameter of about 5 mm and a wall thickness of about 1 mm. Because of the wall thickness, this material can suffer from low permeance that limits the overall membrane performance. Again, the separation mechanism of this glass membrane is based on pore size. Membranes having considerably higher permeance are needed for industrial large-throughput processing applications.

For the sake of clarity, it is noted that, generally, the membrane "permeation flux" is defined as the volume flowing through the membrane per unit area per unit time. The SI unit used is $m^3/m^2 \cdot s$ although other units are often used as well. The detailed description of this disclosure provides additional information. The "permeability coefficient", P (or simply the "permeability") is defined as the transport flux of material through the membrane per unit driving force per unit membrane thickness. Its value must be experimentally determined. The "permeance" is defined as the ratio of the permeability coefficient (P) to the membrane thickness (L). The permeance for a given component diffusing through a membrane of a given thickness is analogous to a mass transfer coefficient.

No current method uses sputtering to create a supported phase separated glass material, which upon further processing (i.e., acid leaching or etching) produces a superhydrophobic, nanoporous glass membrane layer supported on a porous solid substrate. The prior art is limited to a pore size based separation mechanism and does not provide a superhydrophobic membrane surface to enable a new and improved molecular separation mechanism. Additionally, past developments have been mainly for water-permeating membranes. There is a need for preferential ethanol permeation.

BRIEF SUMMARY OF THE INVENTION

Various embodiments provide a superhydrophobic membrane structure having a high throughput (or permeation flux) and a high selectivity (or separation factor). The membrane structures can include a porous support substrate; and a membrane layer adherently disposed on and in contact with the porous support substrate. The membrane layer can include a nanoporous material having a superhydrophobic surface. The superhydrophobic surface can comprise a textured surface, and a modifying material disposed on the textured surface. The modifying material can be selected from an organic material, a polymeric material, and combinations thereof. The membrane can be a layer of material which serves as a selective barrier, remaining completely or substantially impermeable to specific particles, molecules, or substances. Other embodiments relate to methods of making and using the membrane structures.

BRIEF DESCRIPTION OF THE DRAWINGS

These and other features, aspects, and advantages of the present invention will become better understood with reference to the following description and appended claims, and accompanying drawings where:

FIG. 2A shows a scanning electron microscope (SEM) image of alumina substrate before glass deposition;

FIG. 2B shows a scanning electron microscope (SEM) image of alumina substrate after glass deposition;

FIG. 3 shows an SEM image of nanopores after etching the glass coated alumina;

Figure 1:
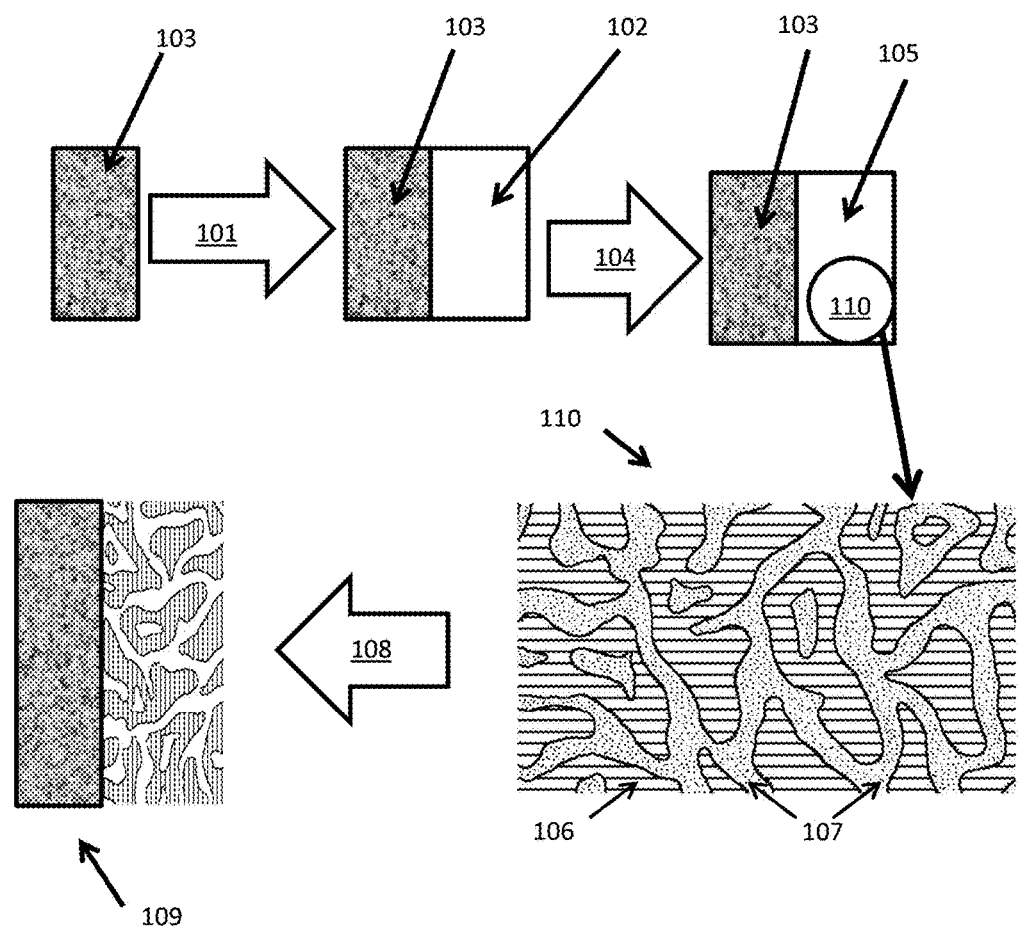
FIG. 1 is a schematic diagram of a synthesis methodology of phase separated nanomembranes according to various embodiments.

It should be understood that the various embodiments are not limited to the arrangements and instrumentality shown in the drawings.

DETAILED DESCRIPTION OF THE INVENTION

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Various embodiments provide beneficial combinations of permeability and selectivity. The permeability unit used is the gas permeation unit (GPU). For purposes of this disclosure, 1 GPU=1×10$^{-6}$ cm$^3$(STP)/cm$^2$·s·cmHg). The membrane selectivity is used to compare the separating capacity of a membrane for two (or more) species. The separation factor is the parameter traditionally used to describe the quality of separation performed by a pervaporation membration. The separation factor of species 1 relative to species 2 ($\beta_{12}$) is defined as the ratio of the ratio of permeate compositions ($C^V$) to the ratio of the feed compositions ($C^L$) as shown in Equation 1.

$$\beta_{12} = \frac{\frac{C_1^V}{C_2^V}}{\frac{C_1^L}{C_2^L}} = \frac{\frac{J_1}{J_2}}{\frac{C_1^L}{C_S^L}} \quad (1)$$

where $J_i$ is the flux of component i. Another and more preferred, measure of separation quality is selectivity ($\alpha_{12}$) which is the ratio of the permeabilities of the two species through the membrane $P_1$ and $P_2$ with units of kmol m m$^{-2}$ s$^{-1}$ kPa$^{-1}$ or units of GPU, as expressed in Equation 2.

$$\alpha_{12} = \frac{P_1}{P_2} \quad (2)$$

In situations where the actual thickness δ, of the membrane is not known or where multilayer membranes are used, permeances can be used instead of permeabilities in Equation 2. Permeance is the driving force normalized flux, which is $P_i/\delta$ for single layer membranes. Therefore, according to various embodiments, the membrane selectivity can be expressed as a ratio of the throughput (or permeability) of hydrophobic molecules to the throughput (or permeability) of hydrophilic molecules. For example, selectivity can be expressed as a ratio of the permeation of ethanol molecules through a membrane to the permeation of water molecules through that membrane.

Various embodiments provide a superhydrophobic membrane having a throughput (or permeation flux) in the range of 10-10,000 GPU, preferably >1000 GPU, with a selectivity (or separation factor) in the range of 25/1 to 500/1, preferably >50/1. Therefore, various embodiments provide a membrane that provides 100× higher permeation flux than zeolite membranes, which are inherently limited by their small pore sizes (<0.5 nm).

Various embodiments provide a unique membrane and a unique membrane fabrication methodology. This disclosure provides several examples of creating the super-surface layer (A-layer) and an underling layer comprising nanoscale nano-architectured pores (NAP), both the A-Layer and the NAP layer being disposed on a porous support that provide mechanical strength to hold the top membrane layer(s).

The membrane according to various embodiments includes the following layers: an A-Layer; a NAP Layer; and a support.

The NAP layer can serve as a transition layer between the A-layer and a support and/or directly as a support to the A-layer. When the NAP layer serves as a support it is thin, typically less than 1 micron in thickness because the support provides mechanical strength to the overall structure. According to some embodiments, however, the NAP layer can be thick enough to provide mechanical strength to the overall structure, such that a support layer can be optional.

The A-layer can be fabricated in a variety of forms, including, but not limited to the following forms:

(1) a polymer/ligand functionalized etched glass, (2) a diatomaceous earth particles-polymer hybrid material, (3) a polymer/ligand functionalized inorganic nanotubes, and/or (4) a polymer/ligand material, if the A-layer is directly deposited on the NAP support that has the surface textures to enable superhydrophobicity.

According to various embodiments, the porous ceramic or metallic support provides mechanical strength to the membrane. The polymer/ligand materials usually contain hydrophobic functional terminal groups and are used for modifying the nano-textured surface of NAP to enable superhydrophobicity. The NAP (i.e., the nanoscale nano-architectured pores) is typically nanoporous having pore sizes ranging from 1-500 nm, which can be fabricated via sol-gel deposition. Furthermore, pore orientation of the NAP can be aligned across the membrane to enhance the permeation flux. According to various embodiments oriented nanotubes comprising NAP can be fabricated via electrochemical anodization.

The A-layer coating, the NAP transition layer, the support substrate, and the deposition method for the A-layer or the NAP layer can be altered. Besides the specifically exemplified deposition (painting, coating) methods for the membrane layers, alternate methods such as screen-printing, doctor-blade techniques can be used to prepare free standing phase separate porous nano-membranes. According to various embodiments, a suitable mixture of borosilicate glass powders can be premixed with suitable metal powders, binders, and solvents into a slurry paste. Suitable metal powders can comprise any transition metals such as Ni, Cu, Pt, Pd; and group IIIB metals, such as Al; group IVB metals, such as Sn. Incorporating metal powders into the membrane structure is mainly for enabling catalytic activity as necessary. Therefore, the metal powders are optional. If a membrane is intended for use only as a separation membrane, there is typically no need for metal powder incorporation. Binders can comprise polyvinyl alcohol or fluorinated polymers. Solvents can comprise isopropanol and methanol. The slurry pastes can be coated onto rigid or flexible platforms using screen-printing techniques. These coatings can then be heat-treated and etched to get phase-separated nanomembranes. Also, these nanomembranes can be lifted off as free-standing membranes through etching of the support material.

According to various embodiments, phase separation can be utilized to prepare porous and non-porous phase-separated glasses (PSG). During the thermal processing of a sodium borosilicate PSG, a glass melt separates into two intertwined phases when cooled below its liquidus temperature. One phase is soluble in acid solutions and the other is insoluble. Chemically etching of phase-separated glass produces mesoporous glass. Acid leaching can be used to create porous glass materials from the PSG, with typical pore diameters ranging from about 3-5 nm. The pore size corresponds to the domain size of the soluble phase. The domain size of phase separation may be controlled by the glass composition and the heat treatment. Generally speaking, a lower cooling rate from the melt or a longer annealing treatment leads to the increased domain size and pore size of acid-leached glass. According to various embodiments, the textured surface of porous glass are further modified by polymer/ligand materials (such as fluorinated molecules) to enable superhydrophobility.

In contrast to VYCOR® glass (described above) in the form of a thick tube having a mesoporous wall, various embodiments provide a method to prepare a thin mesoporous glass coating on a solid or macroporous substrate, such as alumina, silica, titania, or the combination of them. The thin supported glass membranes according to various embodiments can enable both high permeance and surface superhydrophobicity.

According to various embodiments, the porous glass membrane layer is supported on the mechanically strong support. Thin porous glass coatings can offer a solution to achieve improved permeance. Polymer/ligand surface treatment to turn the porous glass surface superhydrophobic, enabling super-surface selectivity for molecular separations. For example, the superhydrophobic surface of the membrane rejects water while attracting ethanol molecules.

In the case of diatomaceous earth (DE) powder-polymer hybrid material layer as the membrane A-layer, the powder-polymer-binder mixture (suspension or paste) in a volatile solvent can be deposited, painted, sprayed, or coated on the porous support substrate. In the suspension or paste, the powder can be made superhydrophobic first. For the preparation of the suspension or paste, the natural grade porous DE powder is preferably heat treated at 400 to 700° C. to remove organic contaminants, and is then coated with a hydrophobic coating on the particle surface. The powder particles provide the surface nanotextures while the coating on DE particles provides hydrophobic functional groups (such as fluorinated or trimethyl terminated functional groups). The hydrophobic coating on particles conforms to the topography of the DE particles, and any excess of coating material is removed. Together the coated powders are superhydrophobic. The superhydrophobic DE particles are partially bonded by the binder during solvent evaporation on a support substrate, forming a DE particle-polymer hybrid layer. This composite layer serves as the membrane with a superhydrophobic surface. The hydrophobic coating on DE particles can be a self assembly monolayer of a perfluorinated silane coupling agent or a thin hydrophobic polymer layer that is thin enough to conform to the particle surface topography. Preferred hydrophobic coating materials consist of perfluorohydrocarbon moieties, which preferably include a tridecafluorohexyl unit. Alternatively the hydrophobic coating on DE particles can include hexafluoropropene oxide oligomer moieties. The hydrophobic ligand/polymer coating precursor can be a molecule of the structure: $X_y(CH_3)_{(3-y)}SiLR$, where y is 1 to 3; X is Cl, Br, I, H, HO, R'HN, R'$_2$N, imidizolo, R'C(O)N(H), R'C(O)N(R''), R'O, F$_3$CC(O)N(H), F$_3$CC(O)N(CH$_3$), or F$_3$S(O)$_2$O, where R' is a straight or branched chain hydrocarbon of 1 to 4 carbons and R'' is methyl or ethyl; L is a linking group, which is $CH_2CH_2$, $CH_2CH_2CH_2$, $CH_2CH_2O$, $CH_2CH_2CH_2O$, $CH_2CH_2C(O)$, $CH_2CH_2CH_2C(O)$, $CH_2CH_2OCH_2$, or $CH_2CH_2CH_2OCH_2$; and R is $(CF_2)_nCF_3$ or $(CF(CF_3)OCF_2)_nCF_2CF_3$, where n is 0 to 24. A preferred molecular structure has y=3, X=Cl, L=$CH_2CH_2$, and R=$(CF_2)_nCF_3$ where n=5. Binder can be a wide variety of polymers including polystyrene, polyvinyl alcohol, or a polyacrylate. The polyacrylate can be poly(methylacrylate), poly(ethylacrylate), poly(methylmethacrylate) or any polymerized ester or acrylic acid or substituted acrylic acid. The role of binder is to bind superhydrophobic DE particles together and to adhere them to the surface of support substrate. Solvents can include volatile solvents including acetone, alcohols, chloroforms, toluene, benzene, and hexane. A preferred binder solution is polystyrene or a polyacrylate dissolved in acetone.

When the nanoporous materials or anodized nanotube materials are used as the support, a polymer/ligand can then be directly deposited on the textured surface of various types of support materials to create a superhydrophobic membrane.

Various embodiments relate to the fabrication of porous supported nano-membranes through transformation of a phase separating glass film into a nanoporous coating. Additionally, various embodiments provide a new membrane technology platform that may take advantage of superhydrophobic surfaces to enable enhanced selectivity of special separations such as ethanol from water. Because the processes described according to various embodiments are not complex, use only inexpensive base materials, and are scalable to large membrane dimensions, the processes offer a practical route to creation of a commercially viable new class of nano-membranes.

Synthesis Methodologies

FIG. 1 is a schematic diagram of a synthesis methodology of phase separated nanomembranes according to various embodiments.

Creating nanoporous membranes from deposited glass can include a first step 101 of depositing glass 102 onto a substrate 103. The substrate can comprise porous alumina. Subsequently, a second step 104 of heat treatment can produce a phase separated glass coating material 105 supported on the substrate 103. As shown in the detailed view 110 in FIG. 1, the phase separated glass coating material 105 can comprise a silica rich phase 106 and a borate rich phase 107. Finally, in a third step 108, the borate rich phase 107 of the phase separated glass coating material 105 can be preferentially acid etched to form a supported nanoporous glass membrane structure 109.

The total membrane thickness can be controlled by controlling the deposition of the glass coating material, such as borosilicate, on the substrate surface. The glass material is not limited to the borosilicate glass. Other phase-separated glasses could also be applied in addition to or instead of the borosilicate glass. The pore size of the coated surface can be controlled by post-heat treatment. Generally, a longer heating time will create larger domain dimension in phase separated glass coating material; thereby increasing pore size upon acid etching to remove the borate rich phase.

A variety of porous ceramic or metal materials can be employed in or as the support substrate. The substrate can comprise porous oxides (such as zirconia, alumina, titania, fused silica), porous metal, anodized alumina, anodized titania, anodized zirconia, anodized hafnia, anodized vanadium oxide, anodized niobium oxide, anodized tantalum oxides can be employed. According to some embodiments, electrically conductive substrates are preferred. Anodized oxides can be converted to oxynitrides or nitrides by annealing in flowing ammonia gas at temperatures ranging from 300 to 800 degrees Celsius. The glass compositions can also comprise soda-lime glass composition, alkali-free glass composition, pyrex, lead glass composition, and other borosilicate compositions.

In addition to sputtering, alternate deposition methods can be employed. The alternate deposition methods can include, but are not limited to, electron beam evaporation, pulsed laser deposition, atomic layer deposition (ALD), chemical vapor deposition (CVD), metal-organic chemical vapor deposition (MOCVD), chemical solution, sol-gel deposition techniques, screen printing, doctor-blade, hot-wire CVD, plasma arc lamp, pulsed electron deposition, and ink-jet printing. Any suitable method can be used to deposit glass materials.

Membrane Structure

Various embodiments relate to a membrane structure comprising: a porous support substrate; and a membrane layer adherently disposed on and in contact with the porous support substrate. The membrane layer can comprise a nanoporous material having a superhydrophobic surface. The superhydrophobic surface can comprise a textured surface, and a modifying material disposed on the textured surface. The modifying material can be selected from an organic material, a polymeric material, and combinations thereof. The porous substrate can support the membrane layer. The textured surface can be functionalized with the organic material. The textured surface can be coated with the polymeric material. The membrane can be a layer of material which serves as a selective barrier, remaining completely or substantially impermeable to specific particles, molecules, or substances.

The membrane can have a permeation flux within a range having a lower limit and/or an upper limit. The range can include or exclude the lower limit and/or the upper limit. The lower limit and/or upper limit can be selected from 5, 10, 15, 20, 25, 30, 35, 40, 45, 50, 55, 60, 65, 70, 75, 80, 85, 90, 95, 100, 200, 300, 400, 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, and 15000 GPU. For example, according to certain preferred embodiments, the membrane can have a permeation flux of from 10-10,000 GPU or of greater than 1000 GPU.

The membrane can have a selectivity of hydrophobic molecules to hydrophilic molecules within a range having a lower limit and/or an upper limit. The range can include or exclude the lower limit and/or the upper limit. The lower limit and/or upper limit can be selected from 5/1, 10/1, 15/1, 20/1, 25/1, 30/1, 35/1, 40/1, 45/1, 50/1, 55/1, 60/1, 65/1, 70/1, 75/1, 80/1, 85/1, 90/1, 95/1, 100/1, 105/1, 110/1, 115/1, 120/1, 125/1, 130/1, 135/1, 140/1, 145/1, 150/1, 155/1, 160/1, 165/1, 170/1, 175/1, 180/1, 185/1, 190/1, 195/1, 200/1, 205/1, 210/1, 215/1, 220/1, 225/1, 230/1, 235/1, 240/1, 245/1, 250/1, 255/1, 260/1, 265/1, 270/1, 275/1, 280/1, 285/1, 290/1, 295/1, 300/1, 305/1, 310/1, 315/1, 320/1, 325/1, 330/1, 335/1, 340/1, 345/1, 350/1, 355/1, 360/1, 365/1, 370/1, 375/1, 380/1, 385/1, 390/1, 395/1, 400/1, 405/1, 410/1, 415/1, 420/1, 425/1, 430/1, 435/1, 440/1, 445/1, 450/1, 455/1, 460/1, 465/1, 470/1, 475/1, 480/1, 485/1, 490/1, 495/1, 500/1, 550/1, 600/1, 650/1, 700/1, 750/1, 800/1, 850/1, 900/1, 950/1, and 1000/1. For example, according to certain preferred embodiments, the membrane can have a selectivity of hydrophobic molecules to hydrophilic molecules of from 25/1 to 500/1.5 or of greater than 50/1.

A particularly preferred membrane can a permeation flux of greater than 1000 GPU, a selectivity of hydrophobic molecules to hydrophilic molecules of greater than 50/1, and the nanoporous material can comprise a plurality of pores having a pore size of from 10 to 50 nm.

The Porous Support Substrate

The nanoporous material can have a plurality of pores having an average pore size within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.1, 45.2, 45.3, 45.4, 45.5, 45.6, 45.7, 45.8, 45.9, 46, 46.1, 46.2, 46.3, 46.4, 46.5, 46.6, 46.7, 46.8, 46.9, 47, 47.1, 47.2, 47.3, 47.4, 47.5, 47.6, 47.7, 47.8, 47.9, 48, 48.1, 48.2, 48.3, 48.4, 48.5, 48.6, 48.7, 48.8, 48.9, 49, 49.1, 49.2, 49.3, 49.4, 49.5, 49.6, 49.7, 49.8, 49.9, 50, 50.1, 50.2, 50.3, 50.4, 50.5, 50.6, 50.7, 50.8, 50.9, 51, 51.1, 51.2, 51.3, 51.4, 51.5, 51.6, 51.7, 51.8, 51.9, 52, 52.1, 52.2, 52.3, 52.4, 52.5, 52.6, 52.7, 52.8, 52.9, 53, 53.1, 53.2, 53.3, 53.4, 53.5, 53.6, 53.7, 53.8, 53.9, 54, 54.1, 54.2, 54.3, 54.4, 54.5, 54.6, 54.7, 54.8, 54.9, and 55 nm. For example, according to certain preferred embodiments, the nanoporous material can have a plurality of pores having an average pore size of from 0.5 to 50 nm, or of from 0.5 to 10 nm.

The porous substrate can comprise a ceramic material, a metallic material, a porous material, and combinations thereof. The porous support substrate can comprise one selected from the group consisting of porous ceramics, porous metals, porous steels, nitrides of any of the foregoing, oxynitrides of any of the foregoing, carbides of any of the foregoing, and combinations thereof. The porous ceramic can be selected from the group consisting of oxides, nitrides, carbides, and combinations thereof. The porous metals can be selected from the group consisting of alumina, zirconia, titania, porous fused silica, anodized alumina, anodized titania, anodized zirconia, anodized hafnia, anodized vanadium oxide, anodized niobium oxide, anodized tantalum oxides, and combinations thereof. The porous support substrate can comprise an anodized porous ceramic material.

The porous support substrate can have a plurality of nanochannels. Each of the plurality of nanochannels can have a diameter within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 910, 920, 930, 940, 950, 960, 970, 980, 985, 990, 995, 996, 997, 998, 999, 999.1, 999.2, 999.3, 999.4, 999.5, 999.6, 999.7, 999.8, 999.9, 1000, 1000.1, 1000.2, 1000.3, 1000.4, 1000.5, 1000.6, 1000.7, 1000.8, 1000.9, 1001, 1001.1, 1001.2, 1001.3, 1001.4, 1001.5, 1001.6, 1001.7, 1001.8, 1001.9, 1002, 1002.1, and 1002.2 nm. For example, according to certain preferred embodiments, each of the plurality of nanochannels can have a diameter of from 1 to 1000 nm or of from 5 to 250 nm.

The plurality of nanochannels can be oriented nanochannels. At least a portion of the plurality of nanochannels can be oriented in a common direction. The portion of the plurality of nanochannels that are oriented in the common direction can comprise a percentage of the total number of nanochannels. The percentage can be with a range within a range having a lower limit and/or an upper limit. The range can include or exclude the lower limit and/or the upper limit. The lower limit and/or upper limit can be selected from 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, and 99%. For example, according to certain preferred embodiments, the percentage can be with a range of from 10 to 90% or from 50-75% of the plurality of nanochannels.

The common direction can be parallel with a line intersecting the support substrate surface at a random angle within a range having a lower limit and/or an upper limit. The range can include or exclude the lower limit and/or the upper limit. The lower limit and/or upper limit can be selected from 0, 1, 2, 3, 4, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 176, 177, 178, 179, and 180 degrees. For example, according to certain preferred embodiments, the common direction can be parallel with a line intersecting the support substrate surface at a random angle of from 0 to 180 degrees, or of from 45 to 135 degrees. The common direction can also be perpendicular to the substrate surface.

The plurality of nanochannels can comprise anodized nanotubes. The plurality of nanochannels can comprise mesoporous channels prepared by sol-gel self-assembly.

The Membrane Layer

Again, the membrane layer can comprise a nanoporous material having a superhydrophobic surface. The nanoporous material can be one selected from a nanoporous glass, a nanoporous oxide, an anodized porous ceramic, and combinations thereof. The nanoporous oxide can be selected from silica, alumina, titania, zirconia, and combinations thereof.

The nanoporous material can comprise a plurality of hierarchical pores with diameters within a range having a lower limit and/or an upper limit. The range can include or exclude the lower limit and/or the upper limit. The lower limit and/or upper limit can be selected from 1, 2, 3, 4, 5, 6, 7, 8, 9, 10, 20, 30, 40, 50, 60, 70, 80, 90, 100, 200, 300, 400, 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, and 15000 nm. For example, according to certain preferred embodiments, the nanoporous material can comprise a plurality of hierarchical pores with diameters ranging from 2 to 10,000 nm, or of from 2 to 100 nm. The nanoporous material can comprise a plurality of mesopores each having a diameter of from 3 to 5 nm.

The nanoporous material can have a thickness within a range having a lower limit and/or an upper limit. The range can include or exclude the lower limit and/or the upper limit. The lower limit and/or upper limit can be selected from 25, 30, 35, 40, 45, 50, 55, 60, 65, 70, 75, 80, 85, 90, 95, 100, 200, 300, 400, 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, and 15000 nm. For example, according to certain preferred embodiments, the nanoporous material can have a thickness of from 100 nm-10,000 nm, or of from 200 nm to 1000 nm.

The nanoporous material can also be one selected from a phase-separated glass, a plurality of inorganic nanotubes, a plurality of diatomaceous earth particles, and combinations thereof. The polymer/ligand material can comprise terminal groups selected from hydrophobic terminal groups, hydrophilic terminal functional groups, and combinations thereof.

Phase-Separated Glass

Again, the nanoporous material can also comprise a phase-separated glass. The phase-separated glass can comprise at least one boron-containing glass composition. The boron-containing glass composition can be selected from a soda-lime glass, a phosphate glass, an alkali-free glass, a lead glass, a fluoride glass, a chalcogenide glass, an aluminosilicate, a borosilicate composition, and combinations thereof. The phase-separated glass can be chemically etched to produce a plurality of nanotextured surface asperities.

Inorganic Nanotubes

Again, the nanoporous material can comprise a plurality of inorganic nanotubes or nanotube arrays. The plurality of inorganic nanotubes can comprise a ceramic selected from the group consisting of $TiO_2$, alumina, silica, zirconia, hafnia, platinum, and combinations thereof.

The nanotube arrays can comprise a meso-sized diameter within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 60, 65, 70, 75, 80, 85, 90, 95, and 100 nm. For example, according to certain preferred embodiments, the nanotube arrays can comprise a meso-sized diameter of 2-50 nm in sol-gel assembly.

The nanotube arrays can comprise electrochemically anodized nanotube arrays with a nanotube diameter within a range having a lower limit and/or an upper limit. The range can include or exclude the lower limit and/or the upper limit. The lower limit and/or upper limit can be selected from 1, 2, 3, 4, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, and 400 nm. For example, according to certain preferred embodiments, the nanotube arrays can comprise electrochemically anodized nanotube arrays with a nanotube diameter of 5-250 nm.

Diatomaceous Earth

Again, the nanoporous material can comprise a plurality of diatomaceous earth particles. The nanoporous material comprising the plurality of diatomaceous earth (DE) particles can be formed by a process comprising bonding the plurality of diatomaceous earth particles to the porous support substrate with a binder selected from the group consisting of a polymeric binder, a sol-gel binder, and combinations thereof; etching the plurality of diatomaceous earth particles with an etchant selected from the group consisting of a solvent, an acid, and combinations thereof to produce a plurality of nanopores; and modifying the porous surface with a hydrophobic polymer/ligand material. The plurality of nanopores can have an average size within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, 99, 100, 101, 102, 103, 104, 105, 106, 107, 108, 109, 110, 120, 130, 140, 150, 160, 170, 180, 190, 200, 210, 220, 230, 240, 250, 260, 270, 280, 290, 300, 310, 320, 330, 340, 350, 360, 370, 380, 390, and 400 nm. For example, according to certain preferred embodiments, the plurality of nanopores can have an average size of from 0.5 to 100 nm, or of from 1-10 nm. The plurality of diatomaceous earth particles can form a particle film layer, and a nanoporous surface of the particle film layer can be modified with a hydrophobic polymer/ligand.

Powder-Polymer Hybrid Material

The nanoporous material can comprise a powder-polymer hybrid material, which can comprise one selected from superhydrophobic diatomaceous earth particles, porous acrylic particles, and combinations thereof.

The superhydrophobic diatomaceous earth particles can be obtained by a process comprising coating a plurality of diatomaceous earth particles with a coating comprising one selected from the group consisting of a hydrophobic ligand molecule, a polymer coating, and combinations thereof. The coating can be a self-assembled monolayer or any layer thin enough to retain the nanotextured surface structures of the diatomaceous earth particles. The plurality of superhydrophobic DE particles can be bonded to the porous support substrate with a polymeric binder.

The powder-polymer hybrid material can be prepared by dispersing the superhydrophobic DE particles or the porous acrylic particles in a solvent containing binder to create a suspension or paste material, and subsequently applying the dispersed particles on a support substrate. The dispersed particles can be deposited to the support substrate by one selected from painting, spraying, coating, and combinations thereof. The superhydrophobic particles can be the plurality of nanoporous diatomaceous earth particles with surface coated with a monolayer of hydrophobic polymer/ligand material to render the particles superhydrophobic. The superhydrophobic particles can also be the plurality of nanoporous acrylic or other particles with a surface coated comprising a monolayer of hydrophobic polymer/ligand material to render the particles superhydrophobic.

Polymer/Ligand Material

The nanoporous material can comprise a polymer/ligand material. The so-called polymer/ligand material can comprise long chain hydrocarbon molecules or polymers containing hydrophobic functional groups selected from the group consisting of tri-methyl-terminal groups, perfluoro-terminal groups, and combinations thereof. The polymer/ligand material can include bi-functional molecules, comprising a hydrophobic terminal group and a binding group, wherein the binding group binds to the textured surface of the nanoporous material of the membrane layer.

Again, the textured surface of the membrane structure can comprise nanoporous nano-architectured pores. The polymer/ligand materials can form a film that conforms to the textured surface of the nanoporous material so as to retain the nanostructured topography of the textured surface. The film can be a self-assembled monolayer (SAM).

The polymer/ligand materials can comprise molecules bound on the surface of the glass that are not completely polymerized. Alternatively, the polymer/ligand material can comprise molecules that are polymerized beyond a monolayer structure. Although the polymer/ligand molecules are polymerized beyond a monolayer structure, the polymer/ligand molecules can remain thin enough to maintain the surface texture tomography of the textured surface, thereby enabling surface superhydrophobicity when used in combination with a suitable hydrophobic modifying material.

The hydrophobic polymer/ligand material can be hydrophobic. The hydrophobic polymer/ligand can comprise one or more molecules having the structure: $X_y(CH_3)_{(3-y)}SiLR$, where y is 1 to 3; X is Cl, Br, I, H, HO, R'HN, R'$_2$N, imidizolo, R'C(O)N(H), R'C(O)N(R''), R'O, $F_3$CC(O)N(H), $F_3$CC(O)N(CH$_3$), or $F_3$S(O)$_2$O, where R' is a straight or branched chain hydrocarbon of 1 to 4 carbons and R'' is methyl or ethyl; L is a linking group, which is $CH_2CH_2$, $CH_2CH_2CH_2$, $CH_2CH_2O$, $CH_2CH_2CH_2O$, $CH_2CH_2C(O)$, $CH_2CH_2CH_2C(O)$, $CH_2CH_2OCH_2$, or $CH_2CH_2CH_2OCH_2$; and R is $(CF_2)_nCF_3$ or $(CF(CF_3)OCF_2)_nCF_2CF_3$, where n is 0 to 24. A preferred structure has y=3, X=Cl, L=$CH_2CH_2$, and R=$(CF_2)_nCF_3$ where n=5. The polymer in the polymer-inorganic hybrid membrane layer can be a binder that adheres superhydrophobic particles together and adhere the superhydrophobic hybrid membrane layer to the surface of support substrate The Organic Material Organic materials can refer to organic ligand molecules, hydrophobic polymers, or binder polymers. Surface-modification can be achieved via functionalization of ligand molecules or via coating a topography-conforming thin film of a hydrophobic polymer on to the nanoporous material surface. Besides surface-modifying polymers, binder polymers can be used in making superhydrophobic polymer-DE hybrid membrane layer.

The organic material can comprise a long-chain silane molecule having a number of carbon atoms within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, and 150 carbon atoms. For example, according to certain preferred embodiments, the organic material can comprise a long-chain silane molecule having a number of carbon atoms of from 1 to 100 carbon atoms.

The long-chain silane molecule can comprise an anchoring group and a terminal group. The anchoring group can be a trichloroyl silane group. The terminal group can be fluorinated. The terminal group can be methylated. The terminal groups can be hydrophobic. The anchoring groups can be covalently bonded to the textured surface of the nanoporous material of the membrane layer. The organic material can render the textured surface of the nanoporous material superhydrophobic.

The organic material can comprise a layer, having a thickness within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, and 800 nm. For example, according to certain preferred embodiments, the organic material can comprise a layer, having a thickness of less than 500 nm, or of less than 10 nm. The layer can be a self-assembled monolayer.

The organic material can cover a percentage of the surface area of the textured surface of the nanoporous material within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40%. For example, according to certain preferred embodiments, the organic material can cover a percentage of the surface area of the textured surface of the nanoporous material of at least about 15-20%.

The organic material can be fluorinated. Relative to a non-fluorinated organic material, the fluorinated organic material can provide an improved degree of hydrophobicity and a higher temperature stability of the terminal groups. The organic material can comprise a terminal group selected from the group consisting of $CF_2$, $CF_3$, and combinations thereof.

The organic material can also be non-fluorinated. The non-fluorinated organic material can comprise tri-methyl terminal groups.

The organic material can comprise one selected from the group consisting of a fluorocarbon, a perfluorocarbon, a polyfluorocarbon, an aliphatic compound, a methylated compound, and combinations thereof.

The organic material can render the textured surface of the nanoporous material oleophilic. The organic material can comprise one selected from a long-chain alkyl group, a long-chain alkoxy group, a long-chain alkylsulfanyl group, and combinations thereof.

The long-chain alkyl group can comprise a number of carbon atoms within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 carbon atoms. For example, according to certain preferred embodiments, the long-chain alkyl group can comprise a number of carbon atoms of from 2 to 50 carbon atoms.

The long-chain alkoxy group can comprise a number of carbon atoms within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50 carbon atoms. For example, according to certain preferred embodiments, the long-chain alkoxy group can comprise a number of carbon atoms of from 1 to 18 carbon atoms.

The long-chain alkylsulfanyl group can comprise a number of carbon atoms within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 carbon atoms. For example, according to certain preferred embodiments, the long-chain alkylsulfanyl group can comprise a number of carbon atoms of from 1 to 50 carbon atoms.

The organic material can comprise a plurality of anchored surfactant molecules. The surfactant molecules can be anionic, cationic, Zwitterionic, and/or nonionic. The surfactant molecules can be selected from the group consisting of Cetrimonium bromide CTAB, Alkyl Polyglucosides, such as TRITON™ available from The Dow Chemical Company, a fluorosurfactant, siloxane surfactant molecules having exposed oleophilic tail groups, and combinations thereof. The exposed oleophilic tail groups can be selected from fluorocarbons, siloxanes, and combinations thereof. A hydrophilic end of the surfactant molecule can be attached to the textured surface of the nanoporous material via adsorption or covalent bonding.

The organic material can render the textured surface of the nanoporous material oleophobic. The organic material can comprise a plurality of anchored oelophobic materials, having exposed oleophobic head groups. The oelophobic materials can bond with the textured surface to create an oil resistant, anti-smudge surface. Various oelophobic coating materials are commercially available from ACULON®.

Apparatus

Various embodiments relate to an apparatus comprising the membrane structure according to the various other embodiments. The apparatus can be selected from a pervaporation membrane, fuel cell, a gas separator, a size-exclusive separator, an oil-water separation membrane, a membrane reactor, a catalytic converter, and combinations thereof.

Method of Making with a Phase-Separated Glass

Various embodiments relate to a method of making a membrane structure. The method can comprise depositing a glass onto a porous support substrate; heating the glass and the porous support substrate to a first temperature at a first rate, wherein the first temperature and the first rate are sufficient to cause the glass to separate into a plurality of phases; cooling the glass and the porous support substrate to a second temperature at a second rate, wherein the second temperature and the second rate are sufficient to cause the glass to solidify into a mass comprising a plurality of intertwined phases; and exposing the glass to an etchant to selectively etch one of the pluralities of intertwined phases thereby forming the nanoporous membrane. The nanoporous membrane can comprise a plurality of mesopores each having a diameter within a range having a lower limit and/or an upper limit. The range can include or exclude the lower limit and/or the upper limit. The lower limit and/or upper limit can be selected from 1, 2, 3, 4, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, and 200 nm. For example, according to certain preferred embodiments, the nanoporous membrane can comprise a plurality of mesopores each having a diameter of from 2 to 50 nm.

The etchant can be an acid. The acid can be diluted HF acid, having a concentration within a range having a lower limit and/or an upper limit. The range can include or exclude the lower limit and/or the upper limit. The lower limit and/or upper limit can be selected from 0.005, 0.006, 0.007, 0.008, 0.009, 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.05, 0.051, 0.052, 0.053, 0.054, 0.055, 0.056, 0.057, 0.058, 0.059, 0.06, 0.061, 0.062, 0.063, 0.064, 0.065, 0.066, 0.067, 0.068, 0.069, 0.07, 0.071, 0.072, 0.073, 0.074, 0.075, 0.076, 0.077, 0.078, 0.079, 0.08, 0.081, 0.082, 0.083, 0.084, 0.085, 0.086, 0.087, 0.088, 0.089, 0.09, 0.091, 0.092, 0.093, 0.094, 0.095, 0.096, 0.097, 0.098, 0.099, 0.1, 0.101, 0.102, 0.103, 0.104, 0.105, 0.106, 0.107, 0.108, 0.109, and 0.11%. For example, according to certain preferred embodiments, the acid can be diluted HF acid, having a concentration of from 0.01 to 0.1%.

The glass can be exposed to the etchant for a time period within a range having a lower limit and/or an upper limit. The range can include or exclude the lower limit and/or the upper limit. The lower limit and/or upper limit can be selected from 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, and 400 seconds. For example, according to certain preferred embodiments, the glass can be exposed to the etchant for a time period of from 10 seconds to 5 minutes.

The glass can be selected from a borosilicate glass, a soda-lime glass, an alkali-free glass, a lead glass, and combinations thereof. The glass can comprise sodium borosilicate. The first temperature can be within a range having a lower limit and/or an upper limit. The range can include or exclude the lower limit and/or the upper limit. The lower limit and/or upper limit can be selected from 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, and 850 degrees Celsius. For example, according to certain preferred embodiments, the first temperature can be from 650 to 720 degrees Celsius.

The first rate can be within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, and 130 minutes. For example, according to certain preferred embodiments, the first rate can be from 5 to 100 minutes.

The depositing step can be performed by one selected from sputtering, electron beam evaporation, pulsed laser deposition, atomic layer deposition (ALD), chemical vapor deposition (CVD), metal-organic chemical vapor deposition (MOCVD), chemical solution deposition, sol-gel deposition, screen printing, doctor-blade deposition, hot-wire CVD, plasma arc lamp deposition, pulsed electron deposition, ink-jet printing, and combinations thereof.

Method of Making with Ceramic NanoTube Arrays

Various embodiments relate to a method of making a membrane structure comprising: depositing a metal layer onto the porous support substrate; performing an electrochemical anodization of the metal layer into oxide nanotube arrays to form a layered structure comprising the porous support substrate, the metal layer, and the oxide nanotube arrays; chemically etching the layered structure to render the nanotube array permeable by applying an etchant to the porous support substrate; and functionalizing the anodized surface with an organic polymer/ligand material comprising one selected from the group consisting of a fluorine-terminated silane, a methyl-terminated siloxane.

The step of chemically etching can comprise removing one or more barrier layers of anodized nanotubes. The nanotube array can be perpendicular to a surface of the porous support substrate. The metal layer can comprise one selected from the group consisting of Ti, Ti-alloys, Al, Al-alloys, Zr, Zr-alloys, Hf, Hf-alloys, and combinations thereof.

The fluorine-terminated silane can have a number of carbon atoms within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 carbon atoms. For example, according to certain preferred embodiments, the fluorine-terminated silane can have a number of carbon atoms of from 1-50 carbon atoms.

Method of Making with Sol-Gel Self Assembly

Various embodiments relate to a method of making a membrane structure comprising: forming a sol-gel comprising an oxide; applying the sol-gel to a porous support substrate; evaporating the sol-gel; and thermally calcining the membrane structure to form a self-assembled mesoporous silica layer comprising a plurality of nanochannels, wherein the nanochannels are oriented in a direction that is perpendicular to a surface of the porous support substrate. The oxide can be one selected from the group consisting of silica, titania, and combinations thereof. The method can further comprise rendering a surface of the membrane structure superhydrophobic by treating the surface with a polymer/ligand material.

Method of Making with Diatomaceous Earth

Various embodiments relate to a method of making a membrane structure comprising: forming a mixture comprising diatomaceous earth powder, a binder, and a solvent; forming a layer of the mixture on a porous support substrate by one selected from spraying, dip-coating, and combinations thereof; etching the layer with an etchant to produce a plurality of nanopores on a surface of the layer. The diatomaceous earth powder can comprise a perfluoro polymer superhydrophobic coating. According to some embodiments, the diatomaceous earth powder does not comprise a perfluoro polymer superhydrophobic coating. The binder can be selected from polyurethane, polystyrene, polyvinyl alcohol, and combinations thereof. The method can further comprise removing the binder by applying a solvent. The solvent can be acetone.

Method of Making with DE-Polymer Hybrid

Various embodiments relate to a method of making a membrane structure comprising: preparing a superhydrophobic diatomaceous earth (DE) powder by coating particles with one selected from the group consisting of a plurality of hydrophobic ligand molecules, a surface topography-conforming thin polymer coating, and combinations thereof; preparing a powder-polymer hybrid material by combining the plurality of superhydrophobic DE particles with a polymeric binder; and depositing the powder-polymer hybrid material onto a porous support substrate. The powder-polymer hybrid material can be prepared by dispersing the superhydrophobic DE particles or the porous acrylic particles in a solvent containing the polymeric binder to create a suspension or paste material. The powder-polymer hybrid material can be deposited onto the support substrate by one selected from the group consisting of painting, spraying, coating, and combinations thereof. The superhydrophobic particles can be the plurality of nanoporous diatomaceous earth particles with surface coated with a monolayer of hydrophobic polymer/ligand material. The superhydrophobic particles can be the plurality of nanoporous acrylic or other particles with surface coated with a monolayer of hydrophobic polymer/ligand material.

EXAMPLE

A radio frequency (RF) sputtering system was used to deposit a layer of borosilicate glass (66 mole % $SiO_2$, 26 mole % $B_2O_3$, and 8 mole % $Na_2O$) onto a porous alumina disk substrate, having a 42 mm diameter, used as received from AdValue Technology. The chamber was pumped down to $10^{-3}$ Torr by a mechanical pump, followed by a turbo pump that further reduced the base-pressure down to $10^{-6}$ Torr. The sputter target was made up of borosilicate glass. Depositions were conducted in Ar and Ar—$O_2$ gas mixture and at room temperature. The glass film was then phase separated by heating in a box furnace under ambient atmosphere. The temperature was increased at a rate of 2 degrees Celsius per minute, to a final temperature of 700 degrees Celsius with a hold time of 20 minutes. After heating the temperature was decreased at the same rate. The samples were then etched in a 5% HF solution for 1 minute. The initial porous textured glass surface is hydrophilic, and turn into superhydrophobic after surface modification with polymer/ligand that contains hydrophobic functional groups such as tri-methyl or tri-fluoro terminated groups.

FIGS. 2A and B show the alumina substrate before and after glass deposition. More specifically, FIG. 2A shows a scanning electron microscope (SEM) image of alumina substrate before glass deposition. FIG. 2B shows a scanning electron microscope (SEM) image of alumina substrate after glass deposition.

Figure 4:
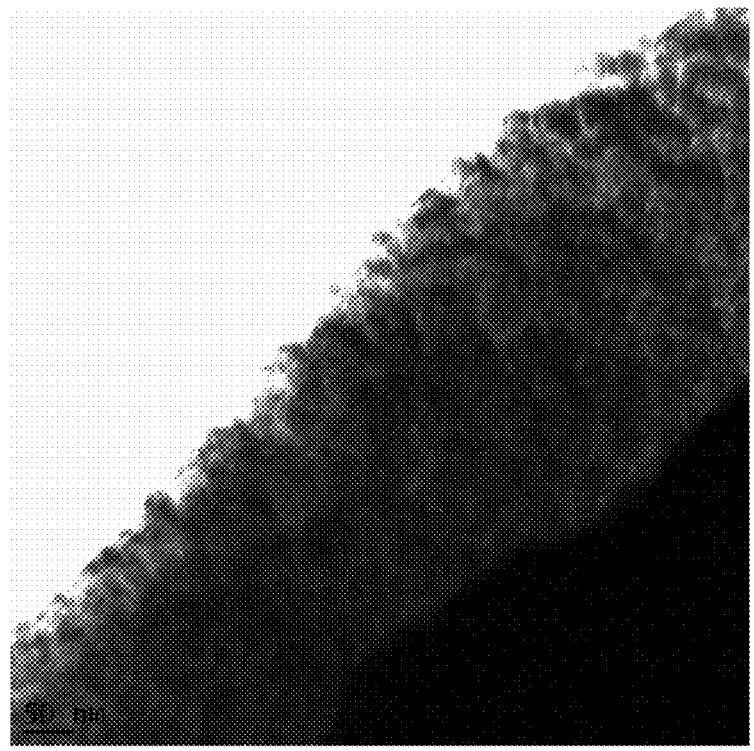
FIG. 4 shows a transmission electron microscope (TEM) image of a cross-sectional sample of a deposited and etched borosilicate glass coating material.

The thickness of the glass film was approximately 1 to 3 µm, typically in the range of a few nanometers to a few micrometers. The borate and silicate phases in the coating were then phase separated by post annealing at 700 degrees Celsius for 20 minutes. The sample was then etched in a 5% HF solution for 1 to 5 minutes. The 1 minute etch time was sufficient to create nanopores, having a pore size less than 100 nm in the glass coating. FIG. 3 shows SEM surface image of an $Al_2O_3$ supported glass structure with nanopores having a size of from 10 to 100 nm after the heat treatment followed by etching. FIG. 4 shows the Transmission Electron Microscope (TEM) images for the cross-section of the deposited glass coating, indicating presence of a few nanometer mesopores.

Furthermore, the surface of above prepared mesoporous glass coating can be chemically treated/functionalized with fluorinated self-assembled monolayer as described in Simpson, J. T. and B. D'Urso, *Transparent, Super-Hydrophobic, Disordered Composite Material*. US Patent number: US 2007/0184247 A1, 2007, which is hereby incorporated by reference in its entirety, to produce a new class of superhydrophobic nanoporous membranes.

The invention is not limited to membrane structures comprising functionalized, phase-separated etched glass. Various embodiments relate to superhydrophobic membrane structures comprising: a porous support substrate and a nanoporous functionalized membrane layer adherently disposed on and in contact with the nanoporous NAP. The nanoporous membrane comprising one selected from the group consisting of functionalized phase-separated etched glass, diatomaceous earth powder-polymer hybrid materials, functionalized inorganic nanotubes, hydrophobic polymer/ligand materials, and combinations thereof.

Figure 5:
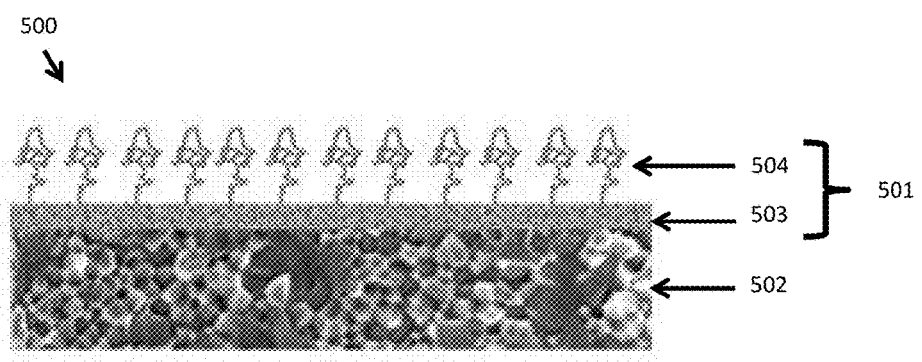
FIG. 5 shows an embodiment of an inorganic membrane structure having a functionalized membrane layer adherently disposed on and in contact with a porous support substrate.

FIG. 5 shows a first embodiment of a superhydrophobic membrane structure 500 comprising a functionalized membrane layer 501 adherently disposed on and in contact with a porous support substrate 502. The functionalized membrane layer 501 comprises a nanoporous membrane 503 having a textured surface modified with functional groups 504. The functional groups can be organic ligand functional groups and/or polymeric functional groups. The nanoporous membrane layer can be etched glass or diatomaceous earth powder-polymer hybrid materials. The suspension of diatomaceous earth-powders that are coated with hydrophobic polymer monolayer in a binder (such as polyvinyl alcohol, polyvinyl butyral, polystyrene, polyacrylate, etc.) and solvent (such as acetone, alcohols, toluene, etc.) can be painted or coated on the support (with or without NAP layer). The hydrophobic coating on DE particles can be a self assembly monolayer of a perfluorinated silane coupling agent or a thin hydrophobic polymer layer that is thin enough to conform to the particle surface topography. Preferred hydrophobic coating materials consist of perfluorohydrocarbon moieties, which preferably include a tridecafluorohexyl unit. Alternatively the hydrophobic coating on DE particles can include hexafluoropropene oxide oligomer moieties. The hydrophobic ligand/polymer coating precursor can be a molecule of the structure: $X_y(CH_3)_{(3-y)}SiLR$, where y is 1 to 3; X is Cl, Br, I, H, HO, R'HN, R'$_2$N, imidizolo, R'C(O)N(H), R'C(O)N(R''), R'O, $F_3CC(O)N(H)$, $F_3CC(O)N(CH_3)$, or $F_3S(O)_2O$, where R' is a straight or branched chain hydrocarbon of 1 to 4 carbons and R'' is methyl or ethyl; L is a linking group, which is $CH_2CH_2$, $CH_2CH_2CH_2$, $CH_2CH_2O$, $CH_2CH_2CH_2O$, $CH_2CH_2C(O)$, $CH_2CH_2CH_2C(O)$, $CH_2CH_2OCH_2$, or $CH_2CH_2CH_2OCH_2$; and R is $(CF_2)_nCF_3$ or $(CF(CF_3)OCF_2)_nCF_2CF_3$, where n is 0 to 24. A preferred molecular structure has y=3, X=Cl, L=$CH_2CH_2$, and R=$(CF_2)_nCF_3$ where n=5. Binder can be a wide variety of polymers including polystyrene, polyvinyl alcohol, or a polyacrylate. The polyacrylate can be poly(methylacrylate), poly(ethylacrylate), poly(methylmethacrylate) or any polymerized ester or acrylic acid or substituted acrylic acid.

The role of binder is to bind superhydrophobic DE particles together and to adhere them to the surface of support substrate. Solvents can include volatile solvents including acetone, alcohols, chloroforms, toluene, benzene, and hexane. A preferred binder solution is polystyrene or a polyacrylate dissolved in acetone.

Figure 6:
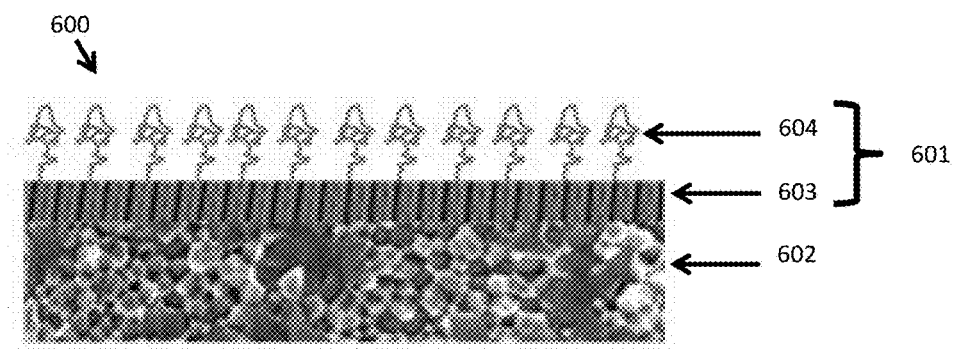
FIG. 6 shows an embodiment of an inorganic membrane structure having a functionalized membrane layer adherently disposed on and in contact with a porous support substrate.

FIG. 6 shows a second embodiment of an inorganic membrane structure 600 comprising a functionalized membrane layer 601 adherently disposed on and in contact with a porous support substrate 602. The functionalized membrane layer 601 comprises a layer 603 comprising a plurality of nano-channels and having a textured surface with organic or polymeric functional groups 604.

Figure 7:
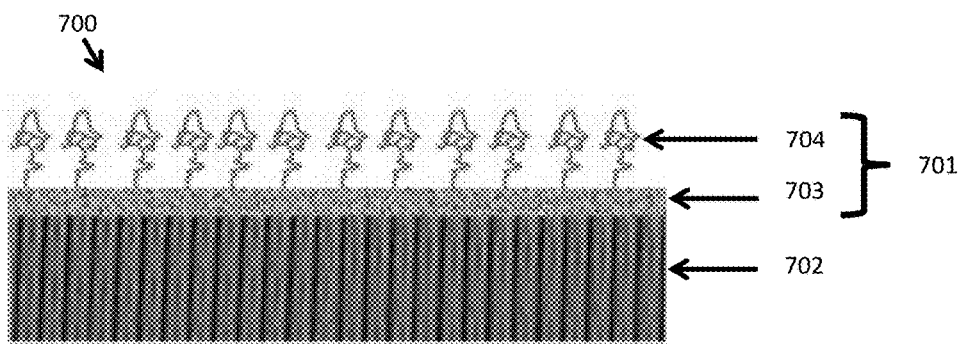
FIG. 7 shows an embodiment of an inorganic membrane structure having a functionalized membrane layer adherently disposed on and in contact with a porous support substrate comprising a plurality of nano-channels.

FIG. 7 shows a third embodiment of an inorganic membrane structure 700 comprising a functionalized membrane layer 701 adherently disposed on and in contact with a porous support substrate 702 comprising a plurality of nano-channels. The functionalized membrane layer 701 comprises a nanoporous membrane 703 having a textured surface with organic or polymeric functional groups 704.

Figure 8:
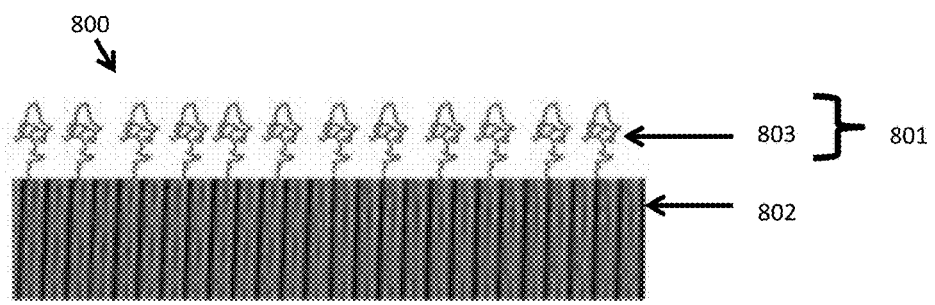
FIG. 8 shows an embodiment of an inorganic membrane structure having a functionalized membrane layer adherently disposed on and in contact with a porous support substrate comprising a plurality of nano-channels.

FIG. 8 shows a fourth embodiment of an inorganic membrane structure 800 comprising a functionalized membrane layer 801 adherently disposed on and in contact with a porous support substrate 802 comprising a plurality of nano-channels. The functionalized membrane layer 801 comprises organic or polymeric functional groups 803.

Figure 9:
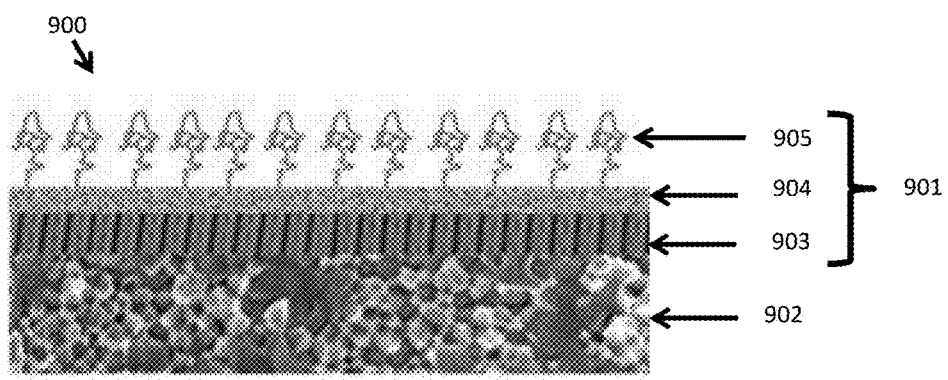
FIG. 9 shows an embodiment of an inorganic membrane structure having a functionalized membrane adherently disposed on and in contact with a porous support substrate 902.

FIG. 9 shows a fifth embodiment of an inorganic membrane structure 900 comprising a functionalized membrane layer 901 adherently disposed on and in contact with a porous support substrate 902. The functionalized membrane layer 901 comprises a layer 903 comprising a plurality of nano-channels, a nanoporous membrane 904 having a textured surface with organic or polymeric functional groups 905.

Method of Using

Various embodiments relate to a method comprising selectively separating a substance from a solution. The method can comprise contacting the solution with a membrane structure according to the various other embodiments and preferentially recovering the substance with high selectivity. The membrane structure can comprise a porous support substrate and a membrane layer adherently disposed on and in contact with the porous support substrate. The membrane layer can comprise a nanoporous material having a textured surface. The textured surface can be modified with an organic material. The organic material can renders the surface superhydrophobic. The textured surface can be functionalized with the organic material. The textured surface can be coated with the organic material.

The solution can be aqueous. The substance to be separated from the solution can be selected from water, a water-soluble organic substance, a water-insoluble organic substance, an alcohol, an organic solvent, a gas, a hydrophobic a hydrophilic particulates, and combinations thereof. The substance can be ethanol and the solution can be water. The substance can be a gas and the gas can be selected from $CO_2$, methane, nitrogen, hydrogen, CO, water vapor, $SO_2$, NOx, and combinations thereof.

Various embodiments provide an alternative membrane design and fabrication methodology that does not rely solely on the pore size of the membrane. According to various embodiments, the membrane design integrates superhydrophobicity/superhydrophilicity of the membrane surface (i.e., A-layer) with the underling nanoscale architectured pores (i.e., NAP) that could be larger than 0.5 nm, typically from 1-5 nm. The super-surface selectivity of the membrane provides new, strong discriminating forces between M1 (e.g., ethanol) and M2 (e.g., water) molecules. In the case of superhydrophobic membrane surface, M2 is rejected away from the membrane surface while M1 is preferentially attracted toward the membrane surface and then permeates through the membrane nano-architectured pores. Due to the supersurface selectivity, the larger pore size (1-10 nm) of underling architectures could be considered to overcome the permeation flux limitation due to small pores, typically less than 0.5 nm, in zeolite membranes. The membrane according to various embodiments can provide permeation flux more than 100 times greater than a zeolite membrane.

Besides water permeation, the membranes according to various embodiments can enable preferential ethanol permeating. Such high-flux, high selectivity membrane can offer an energy saving option for replacing energy-intensive separation processes such as distillation for bioethanol recovery industry or $CO_2$ separation from flue gas at the coal-fired power plant.

Figure 10:
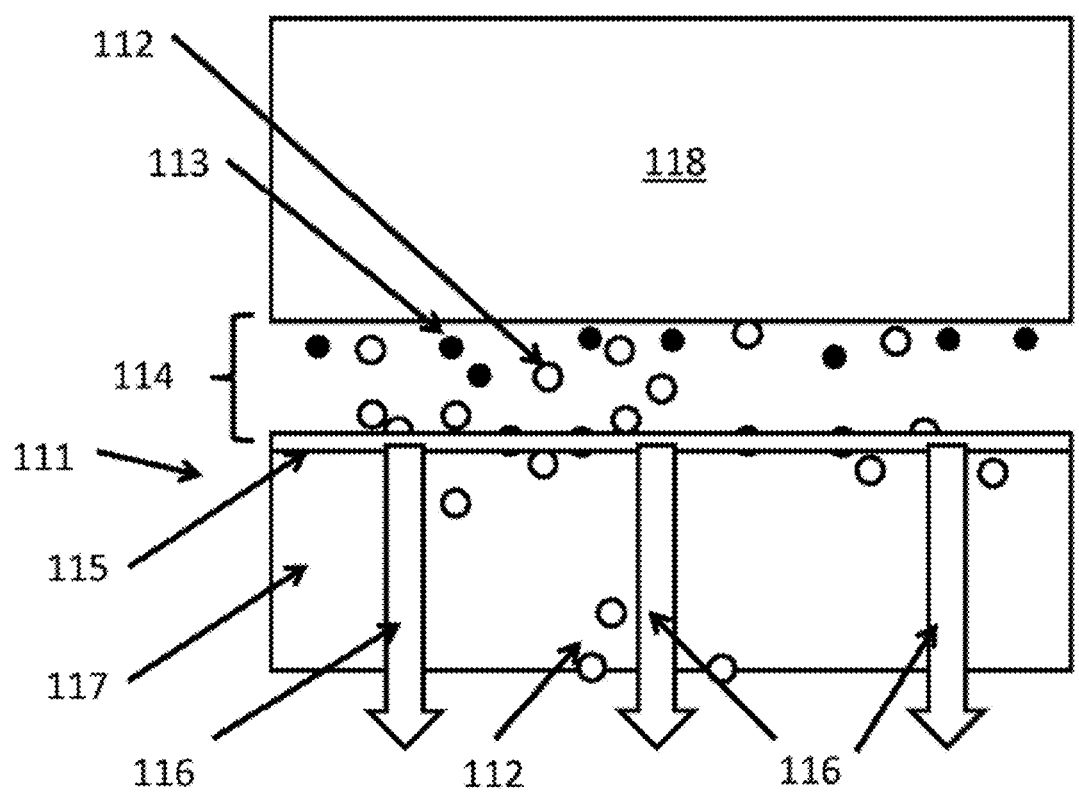
FIG. 10 shows a schematic illustration of a surface-selective membrane, according to various embodiments, for enabling both high selectivity and high permeation throughput for efficient molecular separations.

FIG. 10 shows a schematic Illustration of a membrane 111 comprising an architectured NAP layer 117 and a superhydrophobic membrane surface 115, according to various embodiments, for enabling both high selectivity and high permeation throughput for efficient molecular separations. As shown in FIG. 10 an ethanol-water mixture 118 is separated from the membrane 111 by an air gap 114. The air gap 114 can be caused by the superhydrophobic surface repelling the ethanol-water mixture. The air gap 114 can be under vacuum pressure. Ethanol molecules 112 can selectively permeate 116 through the membrane 111 while water molecules 113 do not.

According to various embodiments, a nanoporous membrane, such as a glass nanoporous membrane, can serve as a separation membrane or as a catalytic membrane for many applications such as gas separation, fuel cells, size exclusive separations, molecular separations, and membrane reactors. Various types of gas can be separated using the nanoporous membranes as separation membranes for gas separation including ethanol vapor, water vapor, hydrogen, oxygen, methane, CO, $CO_2$. Size exclusive separations employing the nanoporous membranes according to various embodiments can be particularly useful in waste treatment applications.

The nanoporous membranes according to various embodiments can also have superhydrophobic (or superhydrophillic) functionalized textured surfaces. Nanoporous membranes with superhydrophobic surfaces can provide enhanced selectivity for separation such as ethanol from water. This is because the superhydrophobicity of membrane surface provide a new molecular discriminating selectivity (e.g., rejecting M2 but attracting M1 molecules when the M1-M2 mixture is exposed to the membrane surface.) Such super surface selectivity is an additional selectivity to the typical pore-size exclusion selectivity. The degree of superhydrophobicity can be controlled by altering the porous membrane surface roughness and the degree of hydrophobicity of one or more hydrophobic polymer/ligand coatings applied to the porous membrane surface. For example, superhydrophobicity may provide an additional mechanism, besides pore size control, for separation of hydrophobic molecules, such as ethanol, from hydrophilic ones, such as water. When the super-surface selectivity works, there is no need to depend on the traditional pore size exclusion mechanism that usually limit the permeation flux for selective molecular separation. In other words, if superhydrophobic force are working on membrane surface, the underling NAP pore size could go larger (1-10 nm) to enhance the permeation flux. The application of superhydrophobic nanomembranes could be easily altered from ethanol separation from water, to many other systems.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C § 112, sixth paragraph. In particular, the use of "step of" in the claims herein is not intended to invoke the provisions of 35 U.S.C § 112, sixth paragraph.

What is claimed is:

1. A method for selectively separating a target substance from a solution mixture, the method comprising contacting the solution with a membrane structure comprising:
   a textured layer comprising a porous material having a plurality of hierarchical pores and a textured surface having a nanotextured surface asperities, the nanotextured surface being formed by at least one selected from the group consisting of phase-separated glass, inorganic nanotubes arrays, diatomaceous earth and porous acrylic particles, a modifying material being disposed on the nanotextured surface, wherein the modifying material is at least one selected from the group consisting of an organic material and a polymeric material, wherein the modifying material renders the surface superhydrophobic or superhydrophilic;
   an inorganic nanoporous support layer supporting the textured layer;
   the membrane structure comprising a feed side with the textured layer being positioned on the feed side, the method further comprising directing the mixture solution first to the textured layer feed side, whereby the target substance in the mixture will be repelled by the textured surface and the modifying material, and the remaining solution will pass through the hierarchical pores of the textured layer and will be selectively filtered by the nanoporous support layer.

2. The method according to claim 1, wherein the substance is at least one selected from the group consisting of water, a water-soluble organic substance, a water-insoluble organic substance, an alcohol, an organic solvent, a gas, a hydrophobic particulate, and a hydrophilic particulate.

3. The method of claim 1, wherein the nanoporous support layer further comprises an intermediate layer, the intermediate layer has pores having a diameter of from 0.5 to 100 nm.

4. The method of claim 3, wherein the pores of the intermediate layer comprise a plurality of nanochannels, wherein each of the plurality of nanochannels has a uniform diameter within a range, the range having a high and low value between from 0.5 to 100 nm, wherein at least 50% of the plurality of nanochannels are oriented in a common direction, wherein the common direction is parallel with a line intersecting the nanochannel layer at an angle, and the solution leaving the textured layer is selectively filtered by the nanochannels according to the range of diameters of the nanochannels to produce a filtered solution, the filtered solution passing through the nanochannels of the nanochannel layer to obtain a permeate solution from which the repelled substance and filtered components have been removed.

5. The method of claim 3, wherein the intermediate layer comprises at least one selected from the group consisting of ceramic and metal materials.

6. The method of claim 3, wherein the nanoporous support layer comprises pores having a diameter of from 0.1 to 1 µm.

* * * * *